United States Patent
Yang et al.

(10) Patent No.: US 12,481,185 B2
(45) Date of Patent: Nov. 25, 2025

(54) ENVIRONMENT-FRIENDLY DISPLAY MODULE AND ENVIRONMENT-FRIENDLY DISPLAY DEVICE

(71) Applicant: Wistron Corporation, New Taipei (TW)

(72) Inventors: Yaochen Yang, New Taipei (TW); Chunlei Zhao, New Taipei (TW); Chia Jang Chen, New Taipei (TW); Chih-Chou Chou, New Taipei (TW)

(73) Assignee: Wistron Corporation, New Taipei (TW)

( * ) Notice: Subject to any disclaimer, the term of this patent is extended or adjusted under 35 U.S.C. 154(b) by 35 days.

(21) Appl. No.: 18/603,146

(22) Filed: Mar. 12, 2024

(65) Prior Publication Data

US 2025/0264749 A1 Aug. 21, 2025

(30) Foreign Application Priority Data

Feb. 19, 2024 (CN) .......................... 202410187190.6

(51) Int. Cl.
*G02F 1/1333* (2006.01)
*F21V 8/00* (2006.01)
*G02F 1/1335* (2006.01)

(52) U.S. Cl.
CPC ..... *G02F 1/133314* (2021.01); *G02B 6/0016* (2013.01); *G02B 6/0088* (2013.01); *G02F 1/133317* (2021.01); *G02F 1/133512* (2013.01)

(58) Field of Classification Search
CPC ......... G02F 1/133314; G02F 1/133317; G02F 1/133512; G02B 6/0016; G02B 6/0088
See application file for complete search history.

(56) References Cited

U.S. PATENT DOCUMENTS 8,833,998 B2 9/2014 Kuo et al.
2014/0340611 A1* 11/2014 Mori ................. G02F 1/133308
349/58

OTHER PUBLICATIONS

Acer, "Acer Vero CB3", Oct. 13, 2021, Available at: https://www.acer.com/us-en/monitors/business/vero-cb3, pp. 1-9.

* cited by examiner

*Primary Examiner* — Anne M Hines
*Assistant Examiner* — Jose M Diaz
(74) *Attorney, Agent, or Firm* — JCIPRNET

(57) ABSTRACT

An environment-friendly display module including a plastic module and a display module is provided. The display module is assembled to a region surrounded by the plastic module, and the display module and the plastic module are partially overlapped. The plastic module is made of post-industrial recycled (PIR) plastic or post-consumer recycled (PCR) plastic. An environment-friendly display device is also provided.

21 Claims, 9 Drawing Sheets

ENVIRONMENT-FRIENDLY DISPLAY MODULE AND ENVIRONMENT-FRIENDLY DISPLAY DEVICE

CROSS-REFERENCE TO RELATED APPLICATION

This application claims the priority benefit of China application serial no. 202410187190.6, filed on Feb. 19, 2024. The entirety of the above-mentioned patent application is hereby incorporated by reference herein and made a part of this specification.

BACKGROUND

Technical Field

The disclosure relates a display module and a display device; more particularly, the disclosure relates to an environment-friendly display module and an environment-friendly display device.

Description of Related Art

With the rapid advancement of technology, lightweight, energy-efficient, and portable smart information products have become omnipresent in our daily lives, and flat display modules are at the heart of this revolution. Among the flat displays, liquid crystal display (LCD) devices, known for their slim profiles, low power consumption, and lack of radiation pollution, are ideal for portable information products, such as laptops, personal digital assistants (PDAs), and mobile phones.

Worldwide regulations, major brands, and their supply chains are imposing increasingly stringent requirements on enterprises, particularly concerning environmental, social, and governance (ESG) aspects and carbon reduction. Failure to meet ESG or carbon reduction standards may potentially lead to the loss of orders or revocation of supplier qualifications.

For manufacturers striving to meet the stringent environmental regulations, in addition to reducing electricity and carbon footprints during production, designing products for optimal recyclability is also required. Hence, how to prioritize high recyclability and ease of disassembly throughout the design process has become a critical focus for technical personnel.

SUMMARY

The disclosure provides an environment-friendly display module and an environment-friendly display device complying with requirements for being lightweight, increasing the product recycling (reuse) ratio, reducing the costs, and so on through the special use and configuration of structural components.

According to an embodiment of the disclosure, an environment-friendly display module includes a plastic module and a display module. The display module is assembled to a region surrounded by the plastic module, wherein the display module and the plastic module are partially overlapped, and a material of the plastic module includes post-industrial recycled (PIR) plastic or post-consumer recycled (PCR) plastic.

According to an embodiment of the disclosure, an environment-friendly display device includes a control module, a back cover, a decorative bar, and the aforesaid environment-friendly display module. The control module is assembled to the plastic module and electrically connected to the display module. The back cover is assembled to the plastic module and enable the control module to be covered between the plastic module and the back cover. The decorative bar is assembled to the plastic module and the back cover and located at a bottom of the plastic module.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
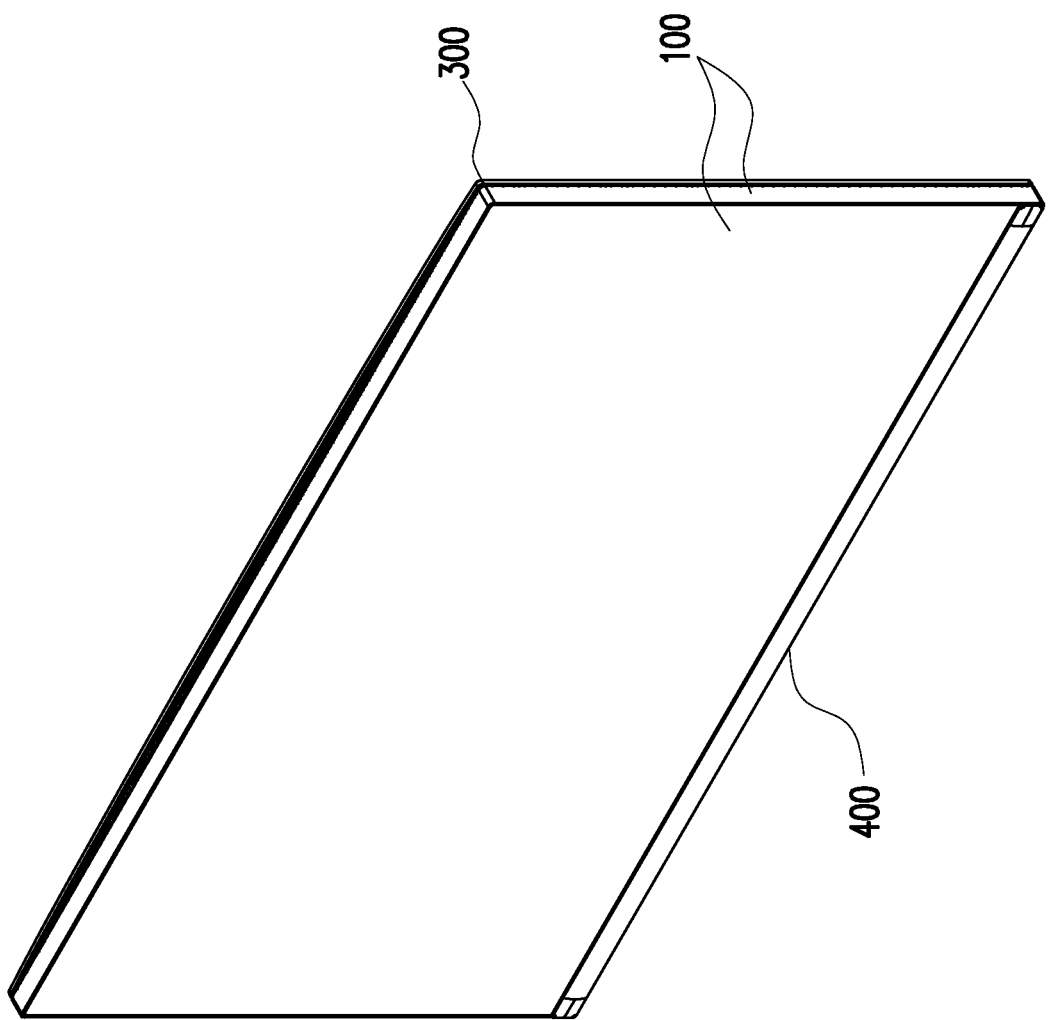
FIG. 1 is a schematic view of an environment-friendly display device according to an embodiment of the disclosure.
Figure 2A:
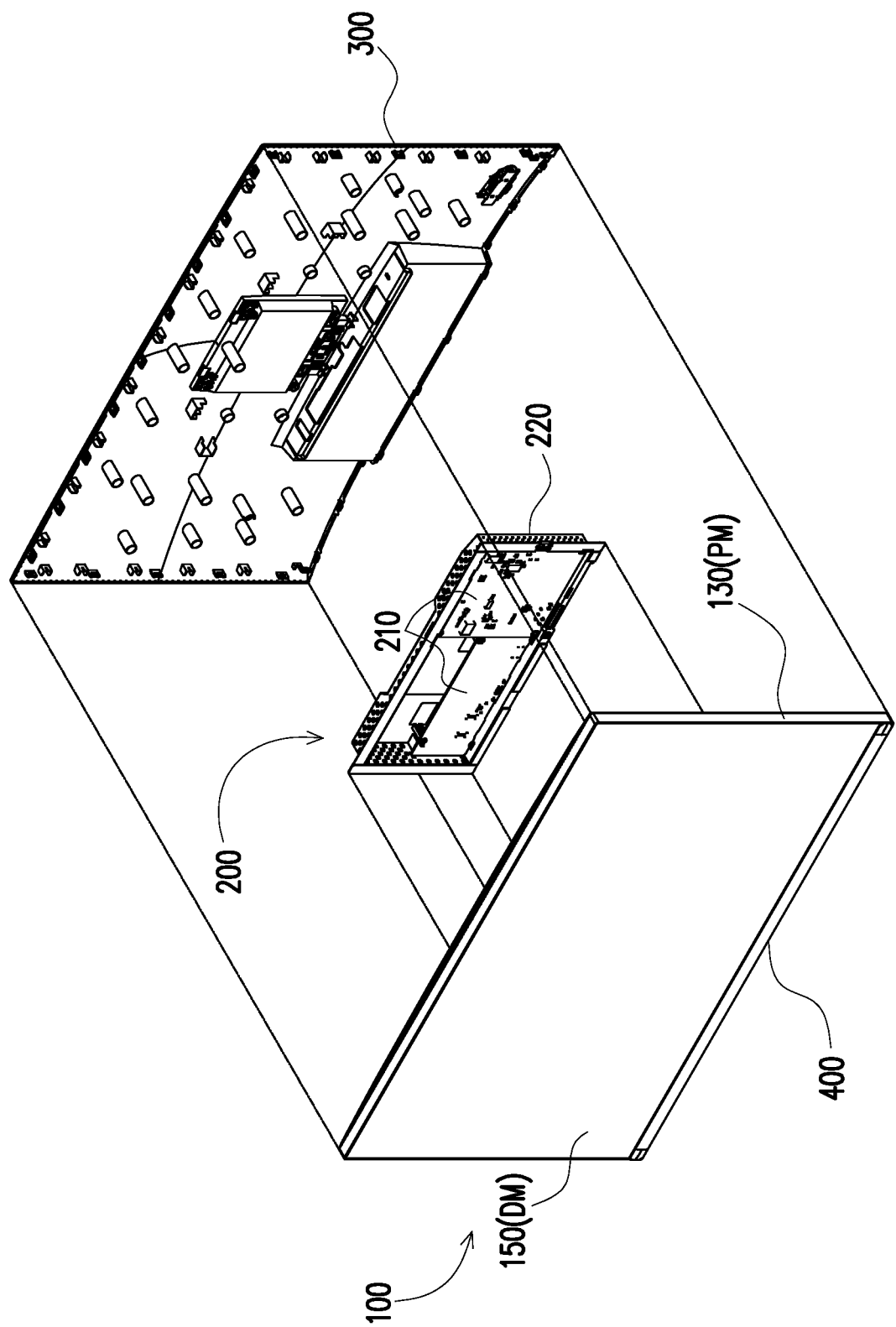
FIG. 2A is an exploded view of some components of the environment-friendly display device in FIG. 1.
Figure 2B:
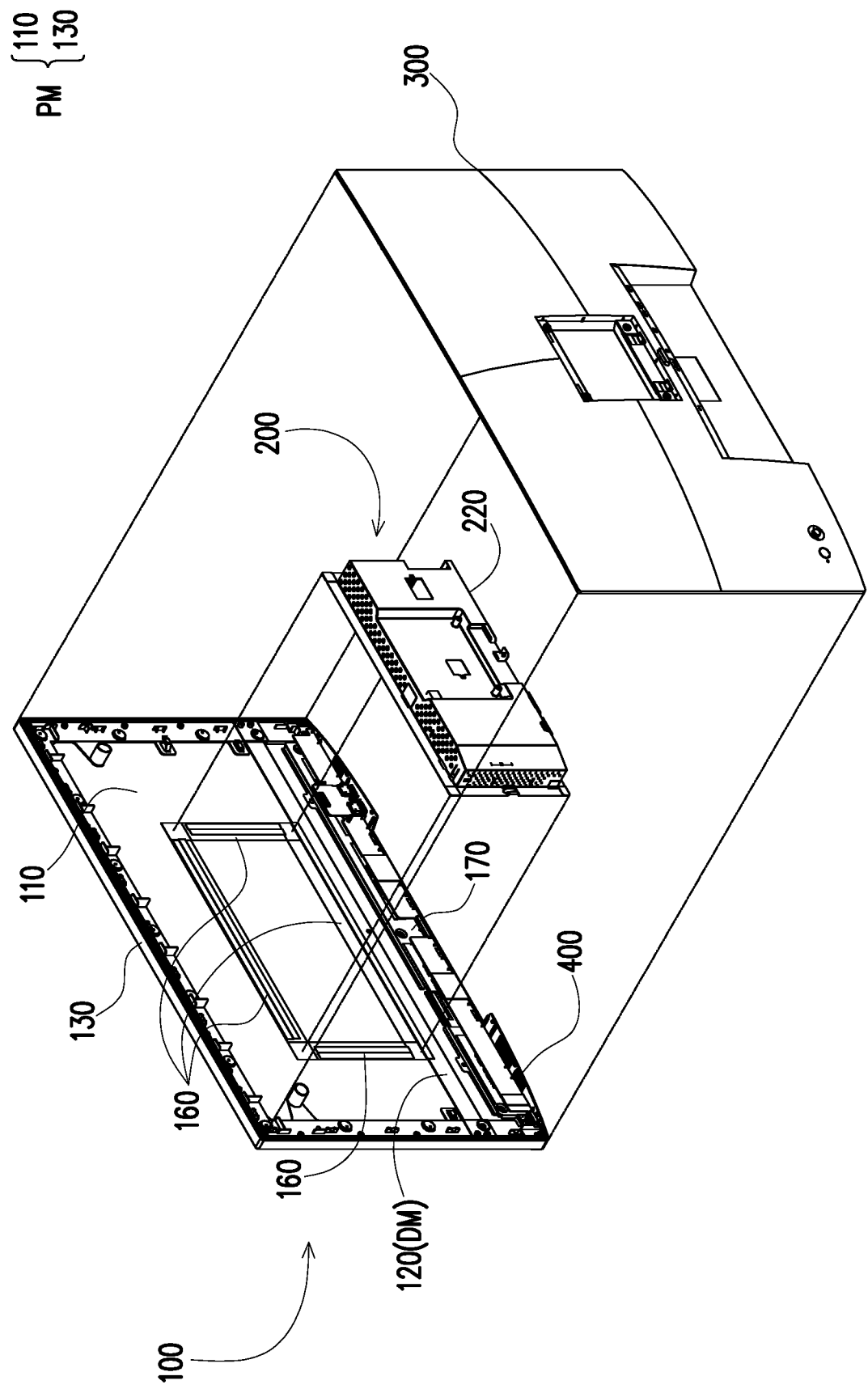
FIG. 2B is an exploded view of FIG. 2A from another viewing angle.

FIG. 1 is a schematic view of an environment-friendly display device according to an embodiment of the disclosure. FIG. 2A is an exploded view of some components of the environment-friendly display device in FIG. 1. FIG. 2B is an exploded view of FIG. 2A from another viewing angle. With reference to FIG. 1, FIG. 2A, and FIG. 2B, in this embodiment, an environment-friendly display device 10 includes an environment-friendly display module 100, a control module 200, a back cover 300, and a decorative bar 400, where the control module 200 is assembled between the environment-friendly display module 100 and the back cover 300, and the decorative bar 400 is assembled to the environment-friendly display module 100 and the back cover 300 and located at a bottom of the structure of the environment-friendly display module 100 and the back cover 300.

Figure 3:
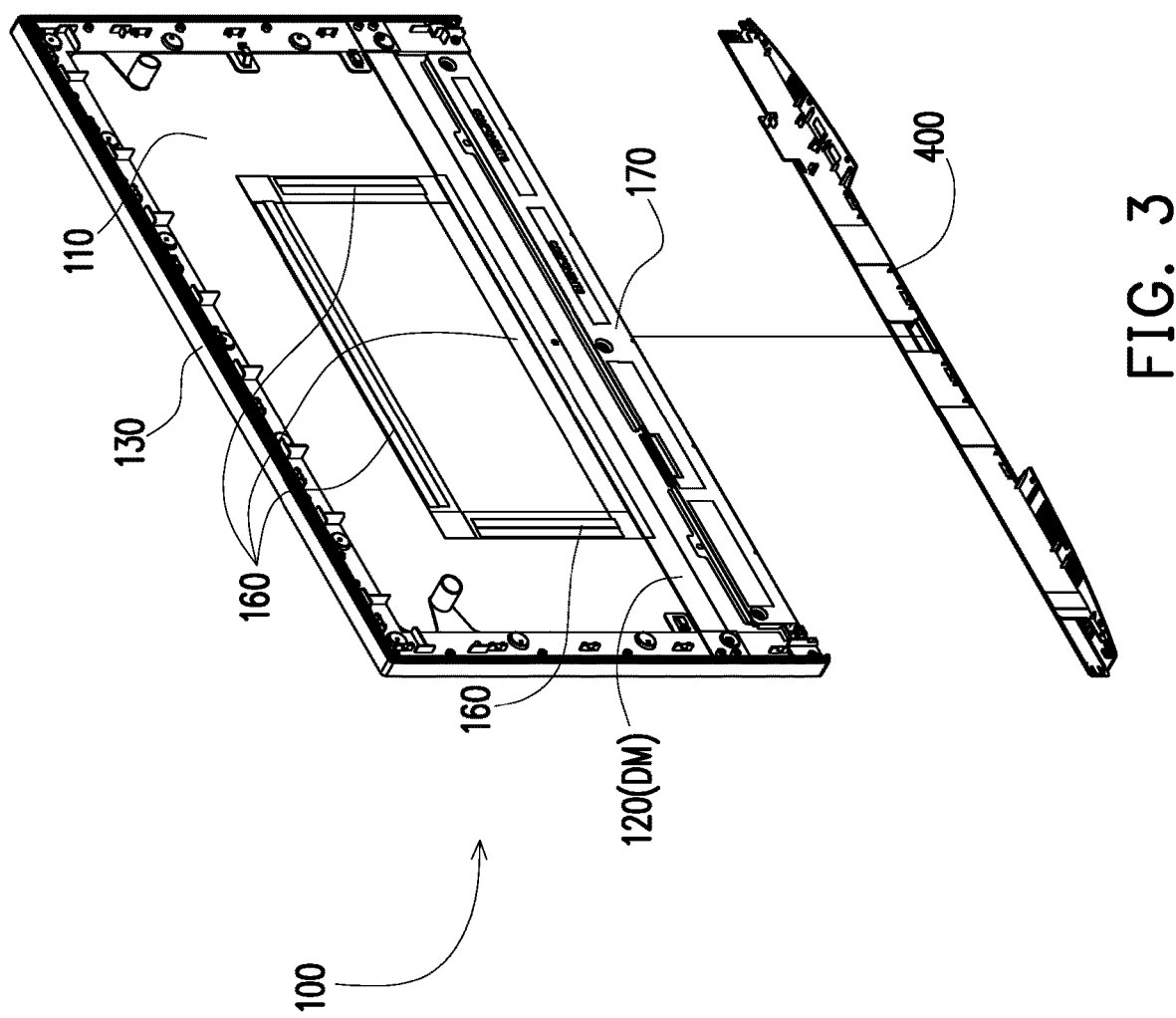
FIG. 3 is an exploded view of some components depicted in FIG. 2B.

FIG. 3 is an exploded view of some components depicted in FIG. 2B. With reference to FIG. 2A, FIG. 2B, and FIG. 3, in this embodiment, the environment-friendly display module 100 includes a plastic module PM and a display module DM that are combined with each other, where the plastic module PM includes a plastic back plate 110 and a plastic middle frame 130, and the display module DM is assembled to a region surrounded by the plastic module PM. The display module DM and the plastic module PM are partially overlapped. A material of the plastic module PM includes PIR plastic or PCR plastic. The PIR plastic refers to plastic wastes generated from manufacturing and processing processes, and the wastes are transformed into new plastic products through recycling and reprocessing. The plastic wastes may come from the residues generated from cutting, molding, and mold production in the factory production process and products that are repaired, tested, or discarded on the production line. The PCR plastic refers to plastic products or packaging materials recycled from consumers after use and reused as new plastic products after recycling treatment. The plastics come from products recycled through recycling bins, recycling facilities, or other recycling channels after consumer use.

The plastic module PM includes a plastic back plate 110 and a plastic middle frame 130, and the display module DM includes a metal bracket 120, a light bar 140, and a panel component 150. After the plastic module PM and the display module DM are assembled, the control module 200, the decorative bar 400, and the back cover 300 are sequentially assembled to the environment-friendly display module 100. Here, the control module 200 is assembled to the plastic module PM and electrically connected to the display module DM. The back cover 300 is assembled to the plastic module PM, and the control module 200 is covered between the plastic module PM and the back cover 300. The decorative bar 400 is assembled to the plastic module PM and the back cover 300 and located at a bottom of the plastic module PM to cover a portion of the display module DM.

Specifically, the control module 200 includes a circuit board component 210 and a metal casing 220. The circuit board component 210 is accommodated in the metal casing 220 and assembled along with the metal casing 220 to the plastic back plate 110 of the environment-friendly display module 100, so that the circuit board component 210 is covered between the metal casing 220 and the plastic back plate 110. The environment-friendly display module 100 further includes conductive fabrics 160 arranged along an opening of the metal casing 220 to form a closed outline. The metal casing 220 may be substantially attached to the plastic back plate 110 through the conductive fabrics 160, and part of the conductive fabrics 160 is attached to the metal bracket 120. Accordingly, the metal casing 220 may effectively provide electrical shielding for the circuit board component 210 covered by the metal casing 220 and may simultaneously serve as a grounding element for guiding the metal bracket 120.

Figure 4A:
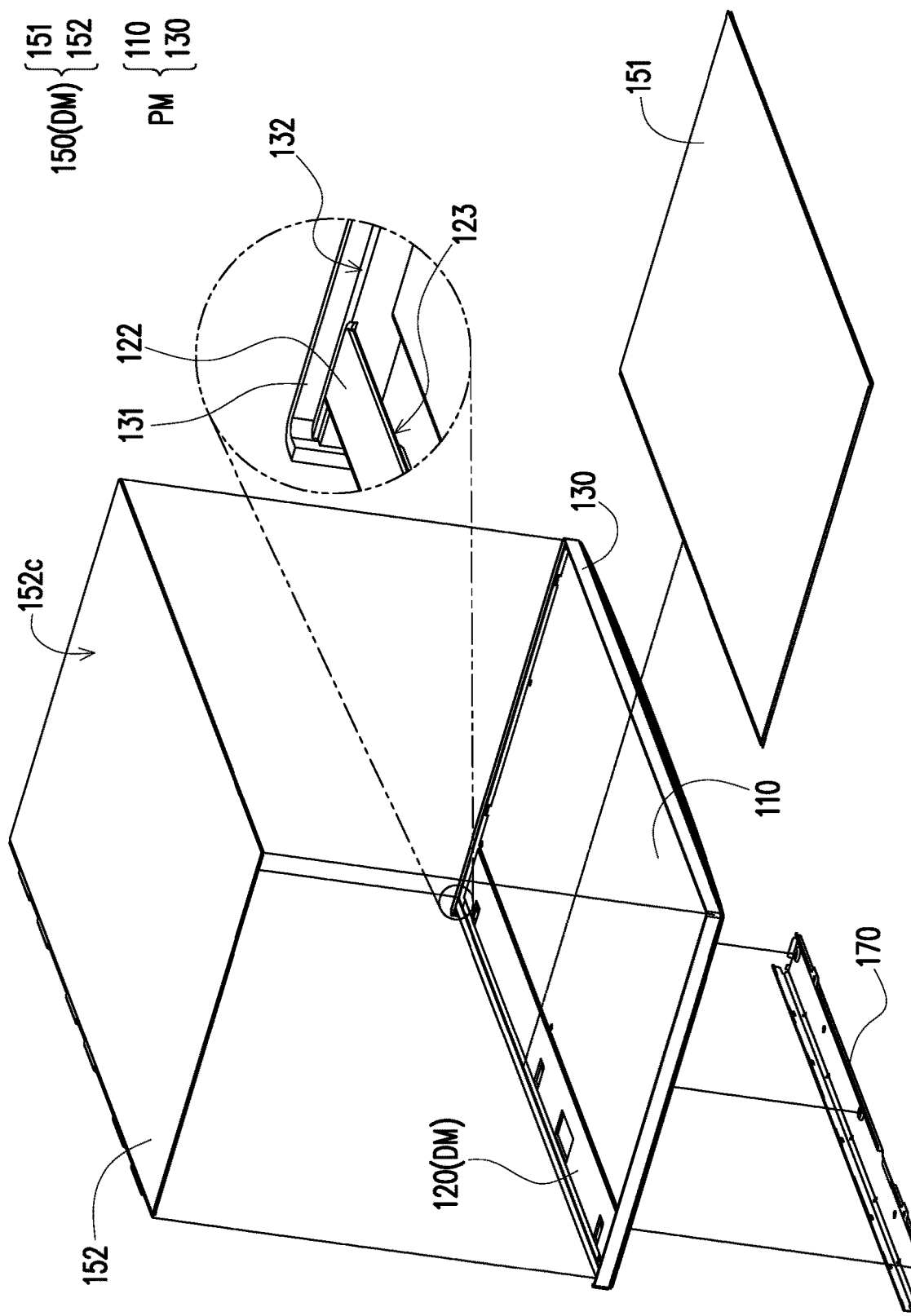
FIG. 4A is an exploded view of some components of an environment-friendly display module.
Figure 4B:
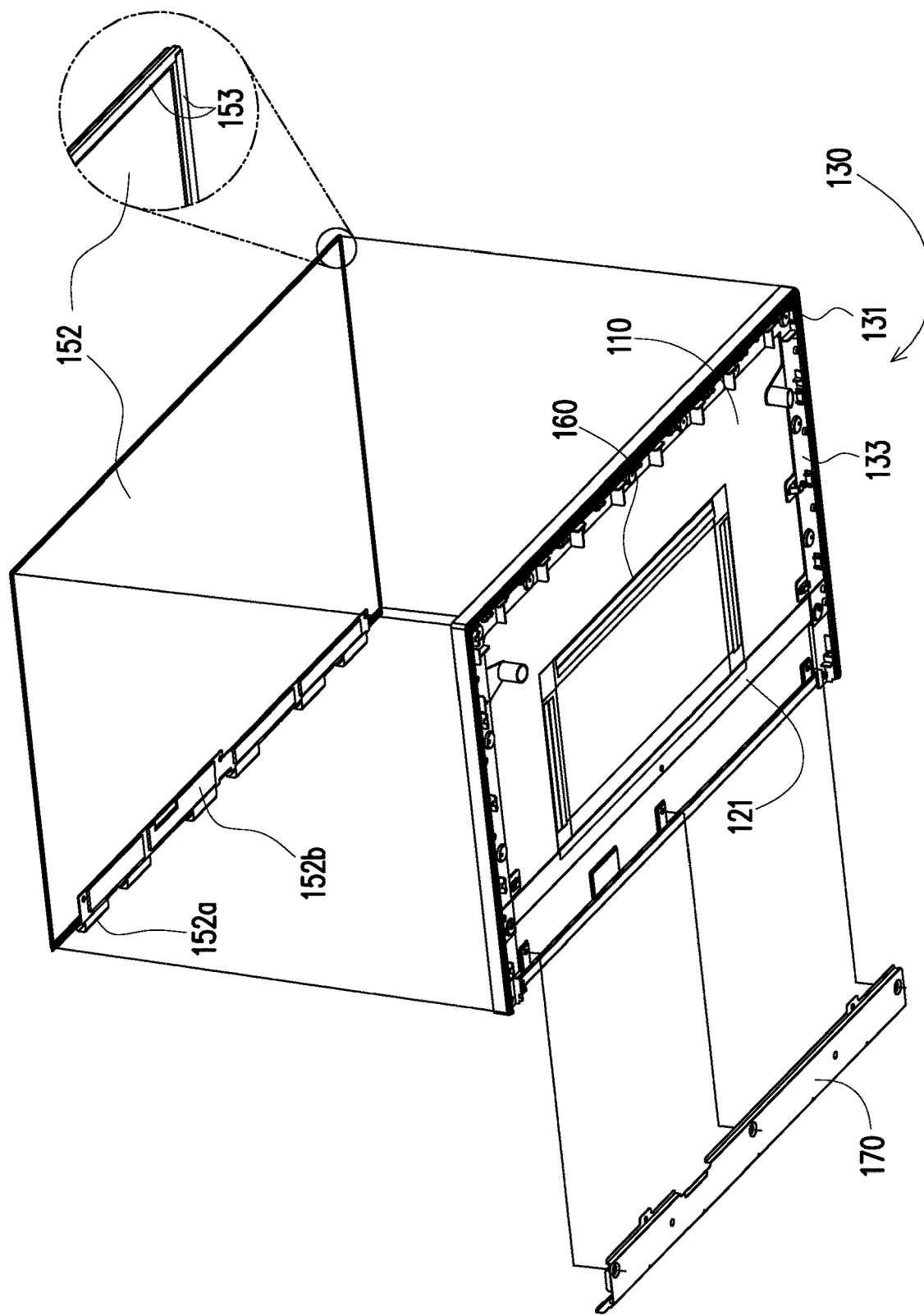
FIG. 4B is the exploded view of FIG. 4A from another viewing angle.
Figure 5:
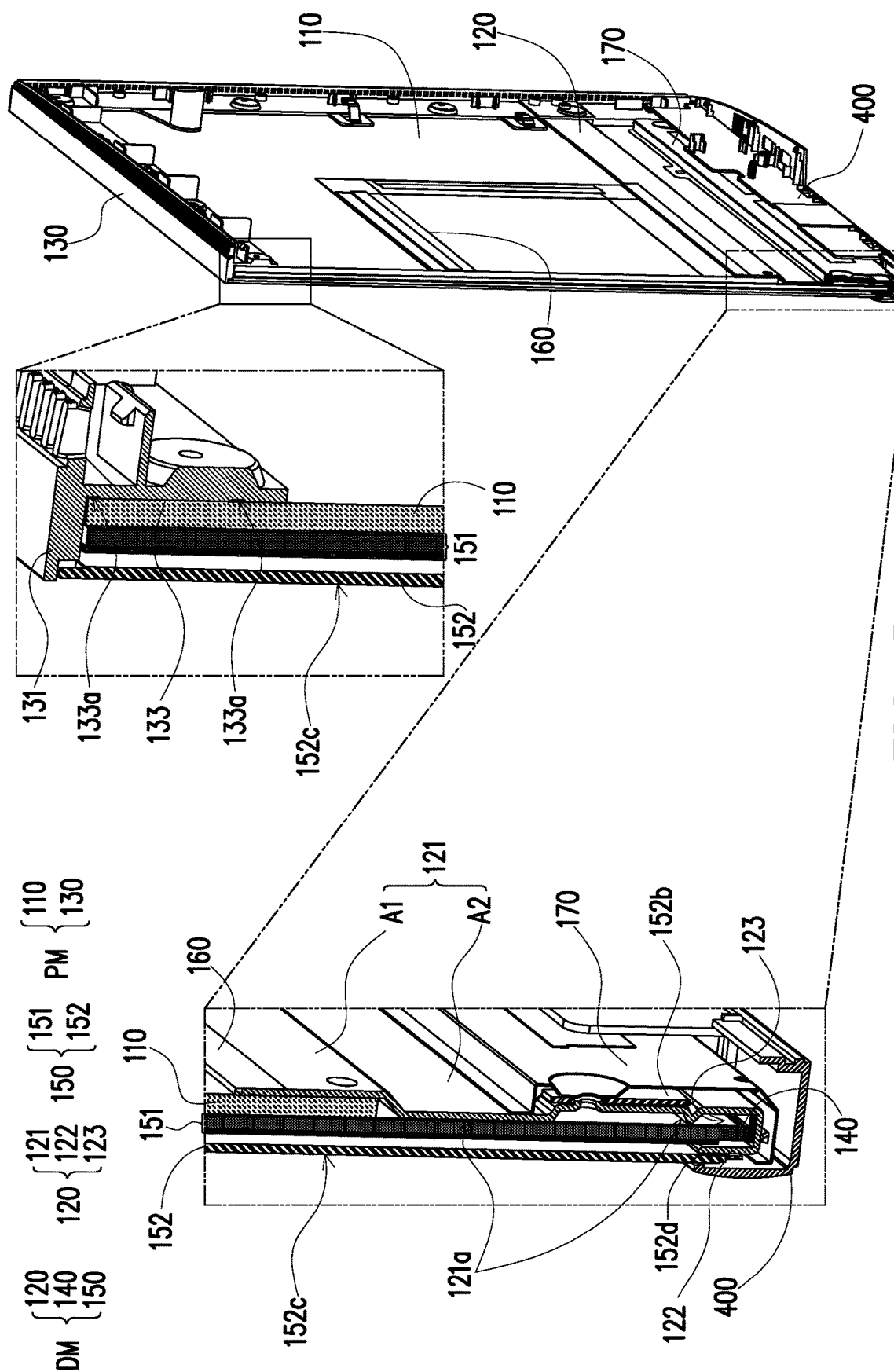
FIG. 5 is a cross-sectional view of some components of an environment-friendly display device.

FIG. 4A is an exploded view of some components of an environment-friendly display module. FIG. 4B is the exploded view of FIG. 4A from another viewing angle. FIG. 5 is a cross-sectional view of some components of an environment-friendly display device, which is equivalent to cutting the environment-friendly display module 100 and the decorative bar 400 at the bottom of the environment-friendly display module 100 shown in FIG. 2B in half. With reference to FIG. 4A, FIG. 4B, and FIG. 5, in this embodiment, the light bar 140 (shown in FIG. 5) is, for instance, formed by a light emitting diode (LED) array, the metal bracket 120 has a support portion 121 and a bent portion 122, the bent portion 122 extends from the support portion 121 and forms a groove 123 to accommodate the light bar 140. The plastic back plate 110 is connected to the support portion 121. The panel component 150 includes a light guide module 151 and a liquid crystal module 152, where a portion of the light guide module 151 extends into the groove 123, and the liquid crystal module 152 is disposed on the light guide module 151 and partially leans against the bent portion 122.

As shown in FIG. 4A, the plastic middle frame 130 includes a side wall 131 and a protruding platform 132 protruding from an inner side of the side wall 131, and the liquid crystal module 152 is able to lean against and be connected to the protruding platform 132 through a connector 153 (as shown in FIG. 4B).

In addition, the environment-friendly display module 100 further includes a shielding mask 170 covering the outside of the bent portion 122 of the metal bracket 120. As shown in FIG. 4B, a plurality of cables 152a and a plurality of circuit board modules 152b of the liquid crystal module 152 extend from a display surface 152c of the liquid crystal module 152, pass through the bent portion 122, and extend to the support portion 121, whereby the cables 152a and the circuit board modules 152b are substantially located between the metal bracket 120 and the shielding mask 170.

At the same time, as shown in FIG. 5, the decorative bar 400 extends from the bottom to the display surface 152c of the liquid crystal module 152, and the liquid crystal module 152 is connected to the bent portion 122 through the connector 153 and located between the decorative bar 400 and the bent portion 122. As shown in FIG. 2B or FIG. 3, the shielding mask 170 is configured to provide shielding for the circuit board modules 152b. At the same time, the circuit board modules 152b may extend to a back side of the plastic back plate 110 (turning away from the panel component 150) through the cables 152a, which is also conducive to the electrical connection of the circuit board modules 152b to the control module 200.

Besides, as shown in FIG. 5, in the metal bracket 120, the support portion 121 provided in this embodiment further includes a first region A1 and a second region A2, where the second region A2 is connected between the first region A1 and the bent portion 122, the first region A1 is configured to support a portion of the plastic back plate 110, and the second region A2 is configured to support a portion of the light guide module 151. Here, compared to a recessed structure applied to support the plastic back plate 110, the support portion 121 further has a plurality of protrusions 121a located in the second region A2, and the protrusions 121a support the light guide module 151 in at least one of a surface contact manner and a line contact manner.

Figure 6:
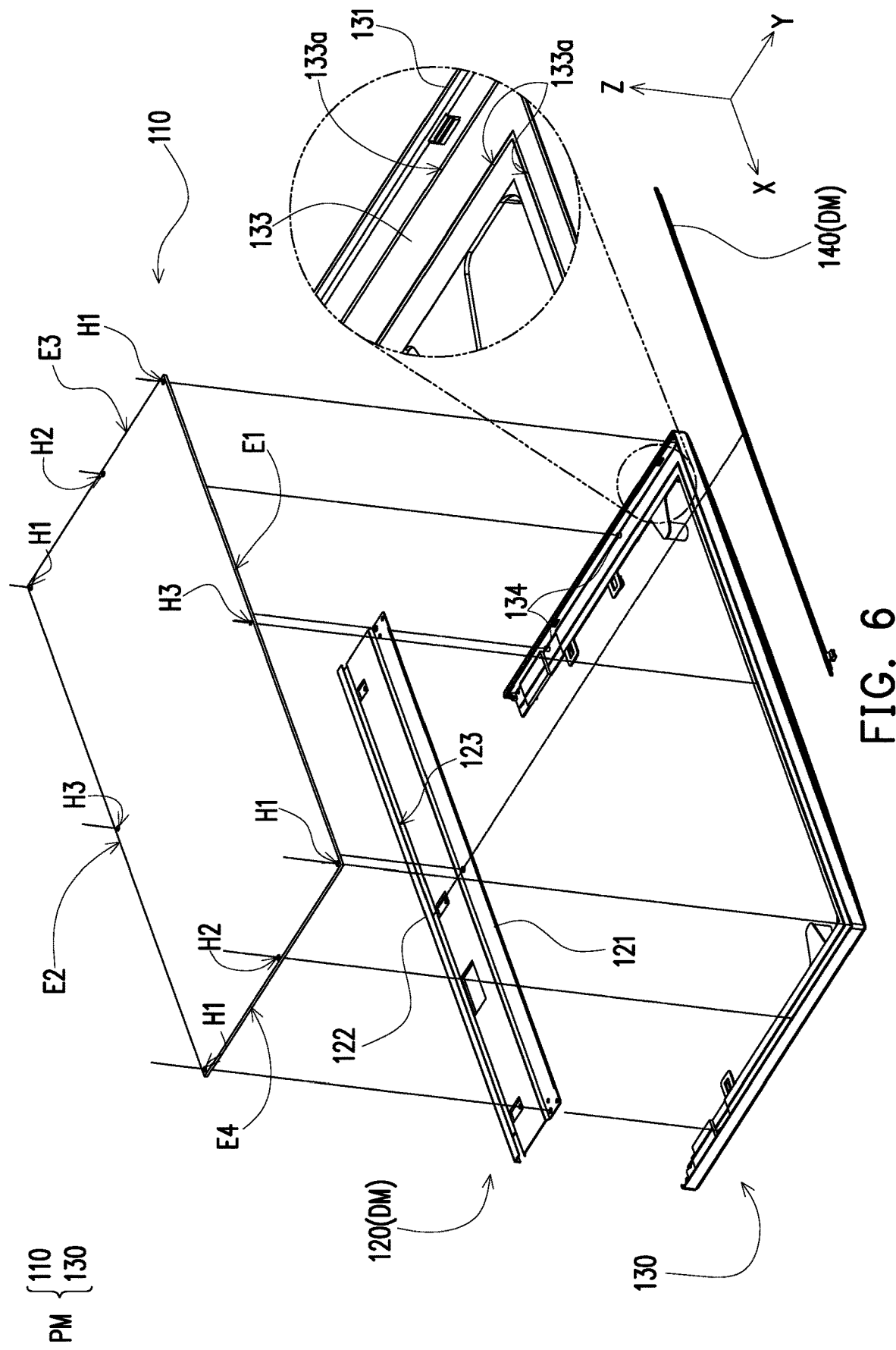
FIG. 6 is an exploded view of some components of an environment-friendly display module.
Figure 7:
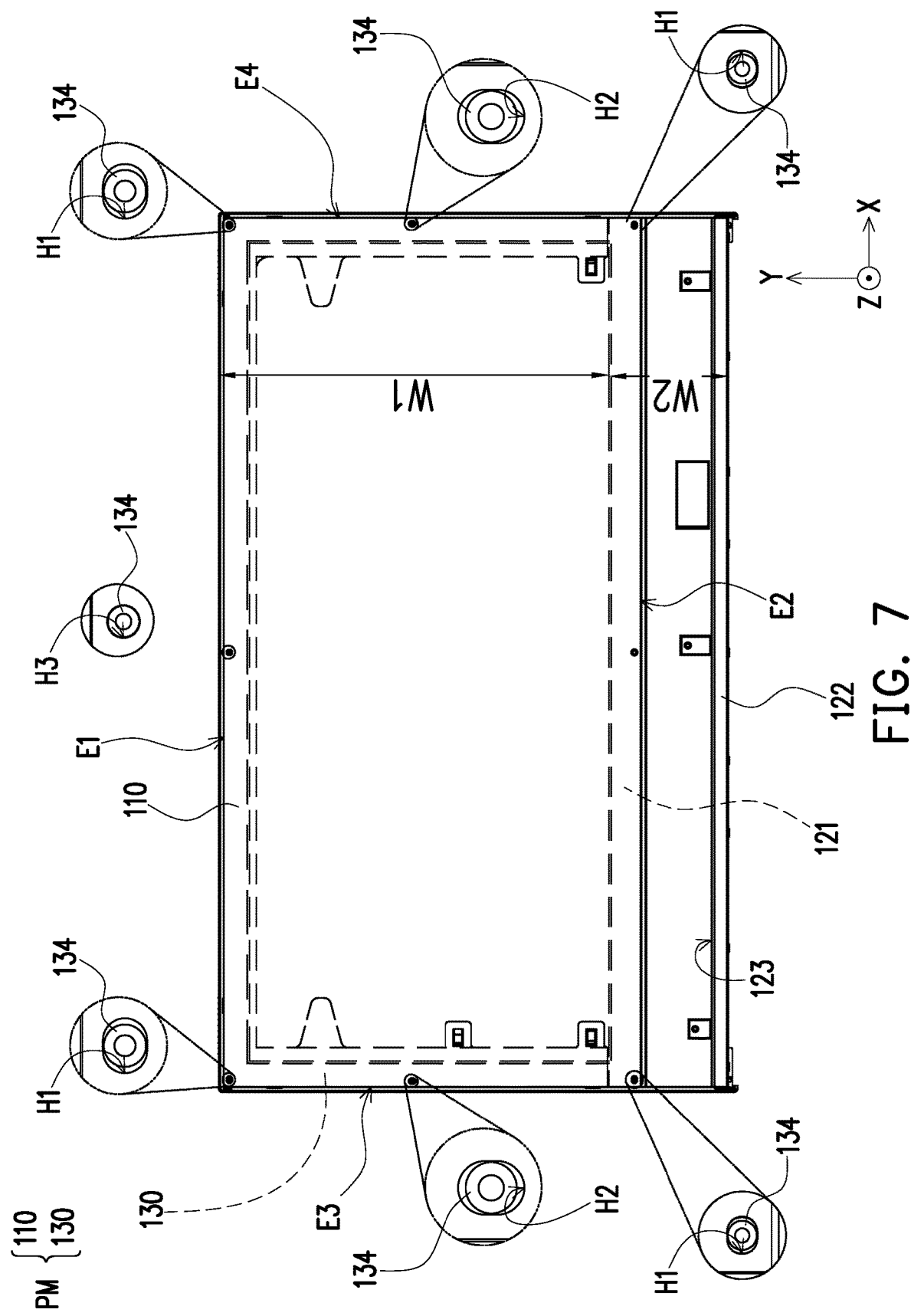
FIG. 7 is a front view of an environment-friendly display module.

FIG. 6 is an exploded view of some components of an environment-friendly display module. FIG. 7 is a front view of an environment-friendly display module, where Cartesian coordinates X-Y-Z are added for the convenience of component description. With reference to FIG. 5 to FIG. 7, in this embodiment, the plastic back plate 110 has a rectangular outline and a top side E1, a bottom side E2, a left side E3, and a right side E4 (where the left side E3 and the right side E4 are illustrated at a viewing angle shown in FIG. 7), the top side E1 and the bottom side E2 are opposite to each other, and the left side E3 and the right side E4 are opposite to each other. Here, the X-axis is considered as a transverse direction of the plastic back plate 110, and the Y-axis is considered as a longitudinal direction of the plastic back plate 110. As shown in FIG. 6, the metal bracket 120 is assembled to the bottom side E2 of the plastic back plate 110, the plastic middle frame 130 is in a U shape, an opening of the U-shaped plastic middle frame 130 faces the bottom side E2, and the plastic middle frame 130 is assembled to and surrounds at least a portion of the plastic back plate 110 and the metal bracket 120. The light bar 140 is assembled into the groove 123 of the metal bracket 120, so that the light guide module 151 partially extending into the groove 123 as shown in FIG. 4A may correspondingly receive light generated by the light bar 140 and project the light toward the liquid crystal module 152.

In this embodiment, the plastic middle frame 130 has a plurality of positioning posts 134, and the plastic back plate 110 has a plurality of positioning holes H1, H2, and H3. The positioning posts 134 pass through and are positioned at the positioning holes H1-H3. To be specific, the positioning holes H1-H3 provided in this embodiment are appropriately varied according to different positioning requirements. As shown in FIG. 7, the positioning hole H1 is an expansion hole, and an expansion direction of the positioning hole H1 is parallel to the X-axis. The positioning hole H2 is an expansion hole as well, and an expansion direction of the positioning hole H2 is parallel to the Y-axis. The positioning hole H3 is a round hole for the positioning posts 134 to directly pass through. As such, in addition to the positioning hole H3 for the direct passage of the positioning posts 134, connecting the positioning posts 134 to various types of expansion holes (i.e., the positioning holes H1 and H2) enables effective accommodation of size tolerance arising from plastic component variations in the manufacturing process, so that the component assembly process may be performed more convenient and streamlined while meeting the positioning requirements.

Besides, as shown in FIG. 7, among the plastic back plate 110, the plastic middle frame 130, and the metal bracket 120, the combination strength of the overlapping parts of the components may be enhanced by allowing the positioning posts 134 to pass through the metal bracket 120 and be positioned at the positioning holes (e.g., the positioning holes H1 and H3 adjacent to the bottom side E2) of the plastic back plate 110.

In this embodiment, the plastic middle frame 130 further includes a platform 133 extending from the side wall 131 and two overflow tanks 133a. The platform 133 is situated between the two overflow tanks 133a, and the plastic back plate 110 may be connected to the platform 133 using an adhesive, while the two overflow tanks 133a serve as adhesive overflow reservoirs. As shown in FIG. 6, the platform 133 and the overflow tanks 133a extend in a U shape along with the main structure of the plastic middle frame 130, thus facilitating connection to the top side E1, the left side E3, and the right side E4 of the plastic back plate 110. Additionally, as shown in FIG. 5, the bottom side E2 of the plastic back plate 110 may be bonded to the support portion 121 of the metal bracket 120 using an adhesive.

Since the plastic back plate 110 and the plastic middle frame 130 provided in this embodiment are made of the PIR plastic or the PCR plastic, it should be mentioned that this choice of materials contributes to an improved recyclability (reusability) ratio for the environment-friendly display module 100 (and the environment-friendly display device 10 using the display module 100). Specifically, in this embodiment, the plastic back plate 110 and the metal bracket 120 are partially overlapped along the longitudinal direction (the Y-axis direction shown in FIG. 7); in this arrangement a portion of the plastic back plate 110 not overlapped with the metal bracket 120 has a first width W1 along the longitudinal direction, the metal bracket 120 has a second width W2 along the longitudinal direction, and $W2/(W1+W2) \leq 1/4$. Here, the width ratio of the metal bracket 120 is designed to meet the heat dissipation requirements of the light bar 140 and minimize the use of metal materials to increase the recyclability ratio of the products, as mentioned earlier.

In other words, the key structural components of the environment-friendly display module 100 (and the environment-friendly display device 10) are the plastic back plate 110 and the plastic middle frame 130, and the metal bracket 120, composed of metal, is intentionally minimized structurally, accounting for less than or equal to one quarter of the overall structure. This deliberate reduction in the proportion of the metal bracket 120 allows the environment-friendly display module 100 (and the environment-friendly display device 10) to prioritize the use of recyclable materials, particularly by increasing the proportion of the plastic components. Consequently, the recycling ratio of the mechanism components may exceed 75%, and the overall recycling ratio of the product (i.e., the environment-friendly display device 10) may surpass 50%, which enables manufacturers to meet ESG standards or carbon reduction (carbon neutrality) standards.

Besides, the increased use of the plastic components results in a significant reduction in the overall product weight and related manufacturing processes and costs. Particularly, the plastic back plate 110 provided in this embodiment is cut from a rolling plate material, thus effectively preventing warping of the plastic back plate 110 caused by injection molding processes. Simply put, as the environmental-friendly display device 10 increases in size and demands thinness, existing plastic injection molded structural components face challenges in maintaining structural strength and flatness (or planarity), and warping occurs frequently due to the expanded surface area. Therefore, larger plastic structural components necessitate the metal components to achieve the required structural strength. However, this approach impedes a significant increase in the product recyclability. Accordingly, in this embodiment, the plastic back plate 110 made by cutting the rolling plate material is adopted to effectively reduce warping and maintain it below 1 mm. Therefore, on the conditions of meeting the structural strength, reducing the manufacturing costs, and reducing weight, larger structural components may be provided without sacrificing the recyclability of the material in the environment-friendly display module 100 (and the environment-friendly display device 10).

To sum up, in one or more embodiments of the disclosure, in the display module and the display device, the existing metal frame is effectively replaced by the plastic back plate and the plastic middle frame. That is, apart from assembling the metal bracket to the bottom side of the plastic structure to accommodate the light bar and meet the heat dissipation requirements, a large proportion of the main structure is replaced with plastic parts, thus effectively reducing product weight, simplifying the manufacturing process, and reducing the manufacturing costs on the premise of maintaining the structural strength. More importantly, the plastic back plate and the plastic middle frame are respectively made of the PIR plastic or the PCR plastic, whereby the recyclability (reuse) ratio of the product is improved, and the ESG corporate requirements for environmental protection and carbon reduction are satisfied.

Here, the plastic back plate, which constitutes the largest area among the structural components, is shaped by cutting the rolling plate material, which not only addresses flatness (or planarity) but also reduces the degree of warping effectively. Conversely, the volume occupied by the metal bracket is less than a quarter of the total volume. This proportion allows the display module to employ recyclable materials for all other structures except for the metal bracket. Consequently, the requirements of modern enterprises for ESG or carbon reduction may be satisfied through the design and use of the recyclable materials and the environmental protection materials.

To sum up, in the environment-friendly display module and the environment-friendly display device having the environment-friendly display module provided in one or more embodiments of the disclosure, the plastic module and the display module are assembled and combined, and the plastic module is made of the PIR plastic or the PCR plastic. This plastic module serves as the primary structure supporting the display module. Accordingly, through the extensive use of plastic structural components, the recyclability of the products provided in one or more embodiments of the disclosure is enhanced, and the products align with contemporary corporate requirements for compliance with ESG standards and carbon reduction through environmentally friendly materials in response to the concerns of recyclability. In addition to the increase in the recycling ratio, the plastic module effectively replaces the existing metal structural components and may further achieve benefits of reducing product weight, simplifying product manufacturing processes, lowering manufacturing costs, and so on.

Although the disclosure has been described above through embodiments, the embodiments do not serve to pose any limitation in the disclosure. Those with ordinary knowledge in the pertinent technical field are able to make some modifications to the disclosed embodiments without departing from the spirit and scope of the disclosure, and therefore the protection scope provided in the disclosure shall be determined by the following claims and their equivalents.

What is claimed is:

1. An environment-friendly display module, comprising:
a plastic module; and
a display module, assembled to a region surrounded by the plastic module, wherein the display module and the plastic module are partially overlapped, and a material of the plastic module comprises post-industrial recycled plastic or post-consumer recycled plastic, wherein the plastic module comprises a plastic back plate and a plastic middle frame assembled to each other, and the plastic middle frame surrounds a portion of the plastic back plate, wherein the plastic back plate has a top side, a left side, a bottom side, and a right side adjacent in sequence to form a closed contour, the top side and the bottom side are opposite to each other, and the left side and the right side are opposite to each other, the plastic middle frame is assembled to the top side, the left side, and the right side and forms an opening at the bottom side, such that the plastic middle frame is discontinuous in structure at the bottom side and presents a U shape.

2. The environment-friendly display module according to claim 1, wherein the plastic back plate is formed by cutting a rolling plate material.

3. The environment-friendly display module according to claim 1, wherein the display module comprises a metal bracket, a light bar, and a panel component, the metal bracket is assembled to a bottom side of the plastic back plate, the light bar is disposed on the metal bracket, and the panel component is disposed in a region formed by the plastic back plate, the metal bracket, and the plastic middle frame.

4. The environment-friendly display module according to claim 3, wherein the plastic back plate and the metal bracket are partially overlapped along a longitudinal direction, one portion of the plastic back plate not overlapped with the metal bracket has a first width W1 along the longitudinal direction, the metal bracket has a second width W2 along the longitudinal direction, and $W2/(W1+W2) \leq 1/4$.

5. The environment-friendly display module according to claim 3, wherein the plastic middle frame has a plurality of positioning posts, the plastic back plate has a plurality of positioning holes, and the positioning posts pass through and are positioned at the positioning holes.

6. The environment-friendly display module according to claim 5, wherein the plastic back plate has a rectangular outline, part of the positioning holes is respectively an expansion hole, and an expansion direction of the expansion holes is parallel to at least one of a longitudinal direction and a transverse direction of the rectangular outline.

7. The environment-friendly display module according to claim 5, wherein the plastic back plate and the metal bracket are partially overlapped, and part of the positioning posts passes through the metal bracket and is positioned at part of the positioning holes of the plastic back plate.

8. The environment-friendly display module according to claim 3, wherein the metal bracket has a support portion and a bent portion, the bent portion extends from the support portion and forms a groove to accommodate the light bar, and a bottom side of the plastic back plate is connected to the support portion.

9. The environment-friendly display module according to claim 8, wherein the panel component comprises a light guide module and a liquid crystal module, a portion of the light guide module extends into the groove to receive light generated by the light bar, the liquid crystal module is disposed on the light guide module and partially leans against the bent portion, and the light is transmitted to the liquid crystal module through the light guide module.

10. The environment-friendly display module according to claim 9, wherein the support portion comprises a first region and a second region, the second region is connected between the first region and the bent portion, the first region supports a portion of the plastic back plate, and the second region supports a portion of the light guide module.

11. The environment-friendly display module according to claim 10, wherein the support portion further has a plurality of protrusions located in the second region, and each of the protrusions supports the light guide module in at least one of a surface contact manner and a line contact manner.

12. The environment-friendly display module according to claim 9, further comprising a shielding mask covering the outside of the bent portion of the metal bracket, and a plurality of cables and a plurality of circuit board modules extend from a display surface of the liquid crystal module, pass through the bent portion and extend to the support portion, and are located between the metal bracket and the shielding mask.

13. An environment-friendly display device, comprising:
an environment-friendly display module, comprising a plastic module and a display module assembled to a region surrounded by the plastic module, wherein the display module and the plastic module are partially overlapped, and a material of the plastic module comprises post-industrial recycled plastic or post-consumer recycled plastic;
a control module, assembled to the plastic module and electrically connected to the display module;
a back cover, assembled to the plastic module and enabling the control module to be covered between the plastic module and the back cover; and
a decorative bar, assembled to the plastic module and the back cover and located at a bottom of the plastic module.

14. The environment-friendly display device according to claim 13, wherein the plastic module comprises a plastic back plate and a plastic middle frame assembled to each other, the plastic middle frame surrounds a portion of the plastic back plate, the control module is assembled to the plastic back plate, the back cover is assembled to the plastic middle frame, so that the control module is covered between the plastic back plate and the back cover, and the decorative bar is assembled to the plastic middle frame and the back cover and is located at a bottom side of the plastic back plate.

15. The environment-friendly display device according to claim 14, wherein the display module comprises a metal bracket, a light bar, and a panel component, the metal bracket is assembled to a bottom side of the plastic back plate, the light bar is disposed on the metal bracket, the panel component is disposed in a region formed by the plastic back plate, the metal bracket, and the plastic middle frame, the control module is electrically connected to the light bar, and the decorative bar covers the metal bracket.

16. The environment-friendly display device according to claim 15, wherein the control module comprises a circuit board component and a metal casing, the circuit board component is accommodated in the metal casing, and the metal casing is assembled to the plastic back plate, so that the circuit board component is covered between the metal casing and the plastic back plate.

17. The environment-friendly display device according to claim 16, further comprising a plurality of conductive fabrics arranged in a closed outline along an opening of the metal casing, wherein the metal casing is attached to the plastic back plate through the conductive fabrics, and part of the conductive fabrics is attached to the metal bracket.

18. The environment-friendly display device according to claim 15, wherein the metal bracket has a support portion and a bent portion, the bent portion extends from the support portion and forms a groove to accommodate the light bar, the bottom side of the plastic back plate is connected to the support portion, the panel component comprises a light guide module and a liquid crystal module, a portion of the light guide module extends into the groove, and the liquid crystal module is disposed on the light guide module and partially leans against the bent portion.

19. The environment-friendly display device according to claim 18, wherein the environment-friendly display module further comprises a shielding mask covering the outside of the bent portion of the metal bracket, a plurality of cables and a plurality of circuit board modules of the liquid crystal module extend from a display surface of the liquid crystal module, pass through the bent portion and extend to the support portion, and are located between the metal bracket and the shielding mask, the decorative bar extends from the bottom side to the display surface of the liquid crystal module, and the liquid crystal module is connected to the bent portion and located between the decorative bar and the bent portion.

20. An environment-friendly display module, comprising:
a plastic module; and
a display module, assembled to a region surrounded by the plastic module, wherein the display module and the plastic module are partially overlapped, and a material of the plastic module comprises post-industrial recycled plastic or post-consumer recycled plastic, wherein the plastic module comprises a plastic back plate and a plastic middle frame assembled to each other, and the plastic middle frame surrounds a portion of the plastic back plate, wherein the plastic middle frame comprises a side wall, a platform extending from the side wall, and two overflow tanks, the platform is located between the two overflow tanks, and the plastic back plate is connected to the platform.

21. The environment-friendly display module according to claim 20, wherein the plastic back plate has a top side and a bottom side opposite to each other and a left side and a right side opposite to each other, and the platform and the two overflow tanks extend in a U shape to connect the top side, the left side, and the right side of the plastic back plate.

* * * * *